Patented Apr. 7, 1931

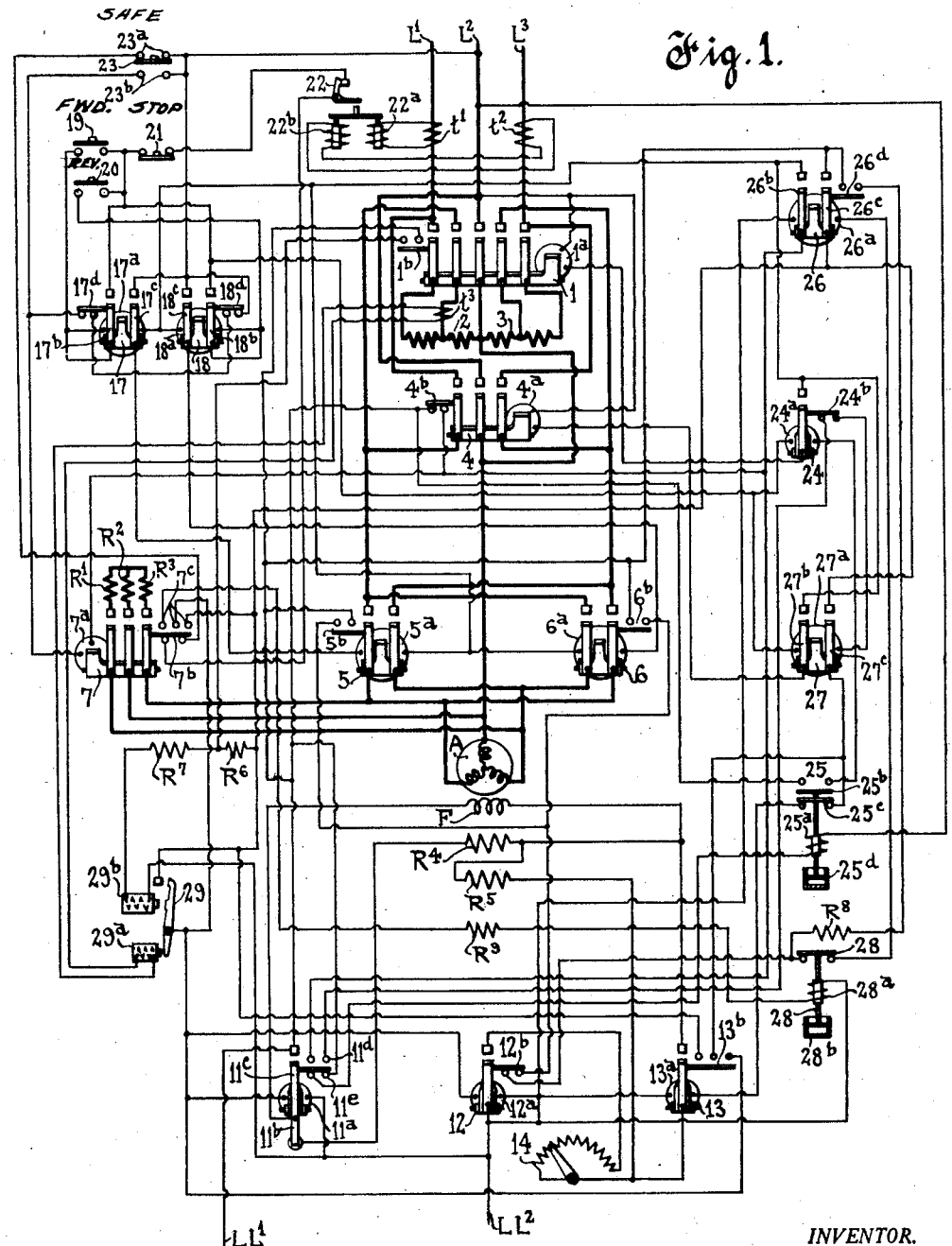

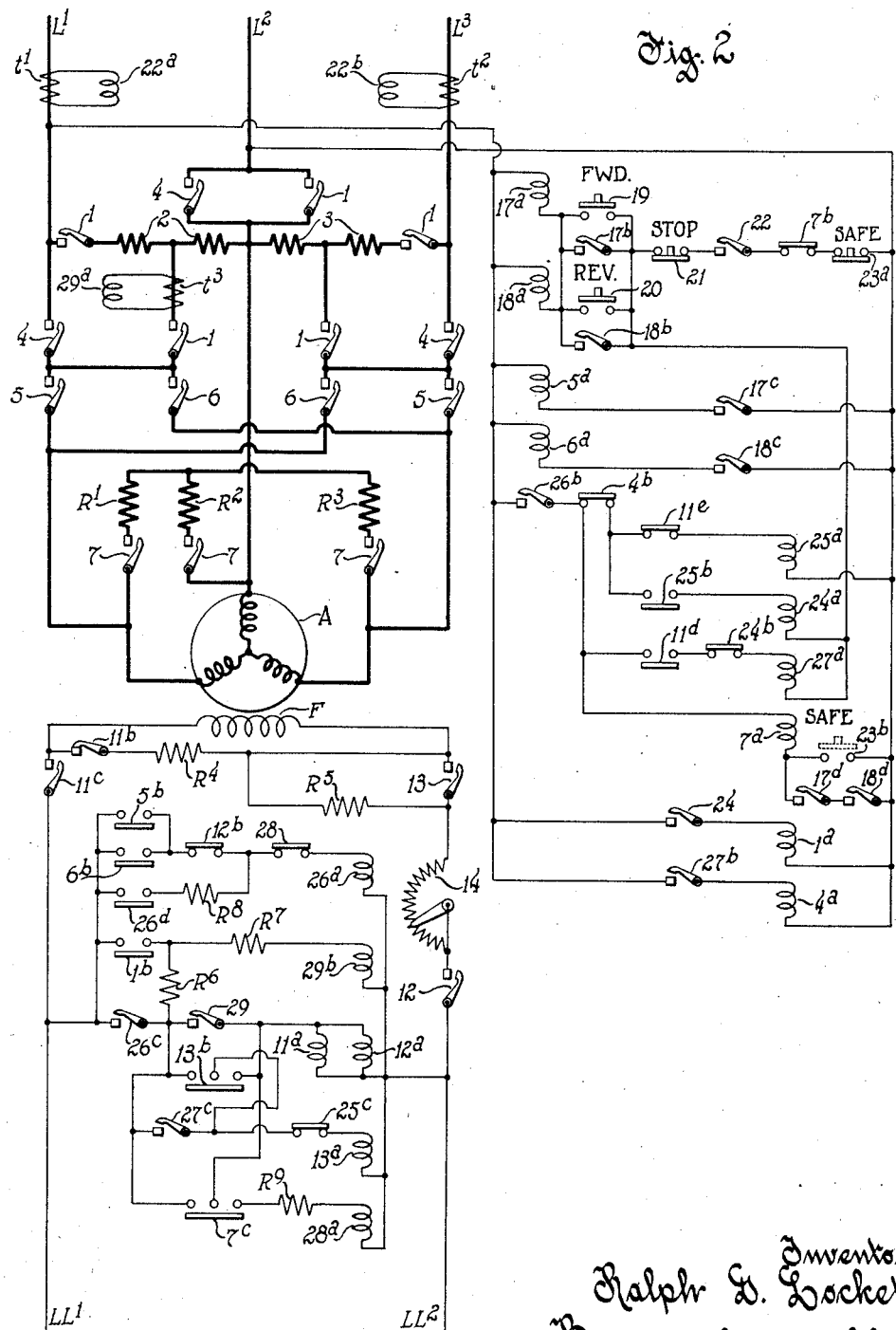

1,799,239

UNITED STATES PATENT OFFICE

RALPH G. LOCKETT, OF MILWAUKEE, WISCONSIN, ASSIGNOR, BY MESNE ASSIGNMENTS, TO CUTLER-HAMMER, INC., OF MILWAUKEE, WISCONSIN, A CORPORATION OF DELAWARE

CONTROLLER FOR SYNCHRONOUS MOTORS

Application filed March 23, 1927. Serial No. 177,644.

This invention relates to motor controllers and is particularly applicable to controllers for synchronous motors.

Synchronous motors are commonly employed in installations such as rubber mills which require quick stopping in emergencies. To effect quick stopping of synchronous motors dynamic braking thereof is usually effected by disconnecting the armature winding from the supply circuit and including a resistor in circuit therewith, while maintaining the field energized. This causes the field to generate a voltage in the armature winding which causes a heavy current to flow therein and the motor is thus converted into an A. C. generator to bring the same quickly to rest. The controllers heretofore employed in connection with motors of the aforesaid character usually provided for establishment of the aforedescribed braking connections upon interruption of the running connections, but heretofore no provision was made for effecting dynamic braking of the motor upon interruption of the starting connections.

The present invention has among its objects to provide an improved controller for synchronous motors wherein provision is made for effecting dynamic braking of the motor upon interruption of starting connections as well as running connections.

Another object is to provide a controller of the aforesaid character wherein provision is made for effecting deenergization of the field winding after a given interval upon establishment of braking connections.

Various other objects and advantages of the invention will hereinafter appear.

The accompanying drawings illustrate an embodiment of the invention which will now be described, it being understood that various modifications may be made in the embodiment illustrated without departing from the spirit and scope of the appended claims.

In the drawing

Figure 1 diagrammatically illustrates a preferred form of the controller, and

Fig. 2 is a so-called across-the-line diagram of the controller illustrated in Fig. 1.

Referring to Fig. 1, the same illustrates a synchronous motor having an armature A and a field F. The armature of the motor is supplied with current from a 3 phase alternating current circuit indicated by lines $L^1$, $L^2$ and $L^3$, while the supply circuit for the field of the motor is indicated by lines $LL^1$ and $LL^2$.

The control means includes a five pole electromagnetically operated switch 1 for establishing starting connections from lines $L^1$, $L^2$ and $L^3$ to the armature A through the medium of compensator windings 2 and 3 and a three pole electromagnetically operated switch 4 for directly connecting said armature to said lines for running. The control means for the armature A also includes a pair of double pole electromagnetically operated reversing switches 5 and 6 and a three pole electromagnetically operated switch 7 which serves as hereinafter set forth to connect resistances $R^1$, $R^2$ and $R^3$ across the terminals of said armature during dynamic braking.

The field F of the motor is controlled by electromagnetically operated switches 11, 12 and 13. Switch 11 is provided with normally closed contacts $11^b$ for connecting the field F across a resistance $R^4$ and the same is also provided with normally open contacts $11^c$ for connecting one terminal of said field to line $LL^1$. The opposite terminal of said winding is arranged to be connected to line $LL^2$ through the medium of a regulating rheostat 14 and a resistance $R^5$ by the field switch 12, the latter being normally open and being of the single pole type. Field switch 13 is also of the single pole type and as hereinafter set forth the same is arranged to establish connections for shunting resistance $R^5$.

The reversing switches 5 and 6 are controlled by electromagnetically operated relays 17 and 18, respectively, and said relays are controlled by normally open push buttons 19 and 20, respectively. Relays 17 and 18 are normally open and each has contacts for shunting its controlling push button and other contacts for controlling its associated reversing switch. Push buttons 19 and 20 control their respective relays 17 and 18 through the medium of a normally closed stop push button 21, a normally closed overload relay 22, normally closed auxiliary contacts 7$^b$ associated with the dynamic braking switch 7 and normally closed contacts 23$^a$ associated with a safety switch 23. The overload relay 24 may be of any desired type and as shown the same is provided with operating windings 22$^a$ and 22$^b$ to be supplied with current by transformers $t^1$ and $t^2$ associated with lines L$^1$ and L$^3$. The safety switch 23 as before stated is provided with normally closed contacts 23$^a$ and the same is also provided with normally open contacts 23$^b$ for controlling switch 7 as hereinafter set forth.

Starting switch 1 is controlled by a normally open electromagnetic relay 24 and the operating winding of said relay is controlled by an electromagnetic timing relay 25 through the medium of a normally open electromagnetic relay 26 and normally closed auxiliary contacts 4$^b$ associated with running switch 4. The timing relay 25 is provided with a set of normally open contacts 25$^b$ and a set of normally closed contacts 25$^c$, the former for controlling the relay 24 and the latter serving as hereinafter set forth to control the field switch 13. Also said relay is provided with a dash pot 25$^d$ for delaying return thereof to normal position.

Running switch 4 is controlled by an electromagnetically operated relay 27 and the operating winding of said relay is controlled by the aforementioned electromagnetically operated relay 26, normally open auxiliary contacts 11$^d$ associated with field switch 11 and normally closed auxiliary contacts 24$^b$ associated with relay 24. The energizing circuits for the operating windings of starting switch 1 and running switch 4 are also controlled by the aforementioned stop push button 21, overload device 22, the normally closed auxiliary contacts 7$^b$ associated with switch 7 and the normally closed contacts 23$^a$ associated with safety switch 23.

Braking switch 7 is controlled by the aforementioned relay 26, and also by the aforementioned normally open contacts 23$^b$ associated with the safety switch and the normally closed auxiliary contacts 17$^d$ and 18$^d$ associated with the relays 17 and 18.

Relay 26 is controlled through the medium of normally open auxiliary contacts 5$^b$ and 6$^b$ associated with the reversing switches 5 and 6, normally closed auxiliary contacts 12$^b$ associated with field switch 12 and an electromagnetic timing relay 28, which is normally closed and is adapted to open against the action of a dash pot 28$^b$. Relay 26 is also provided with normally open auxiliary contacts 26$^d$ for establishing a maintaing circuit therefor including relay 28 and a resistance R$^6$.

Field switches 11 and 12 are both controlled by relay 26 through the medium of a relay 29, the latter being normally open and having a restraining winding 29$^a$ for holding the same in open position and an operating winding 29$^b$ for effecting closure thereof against the action of said restraining winding. Restraining winding 29$^a$ is supplied with current by a transformer $t^3$ which is subjected to the starting current while winding 29$^b$ is controlled by normally open auxiliary contacts 1$^b$ associated with the starting switch 1, and as hereinafter set forth relay 29 in responding is maintained through the medium of contacts 26$^c$ of relay 26 and resistances R$^6$ and R$^7$.

The field switch 13 as hereinbefore stated is controlled by contacts 25$^c$ of timing relay 25 and said switch is also controlled by contacts 26$^c$ and 27$^c$ of relays 26 and 27. Field switch 13 is provided with normally open auxiliary contacts 13$^b$ for establishing a maintaining circuit for itself and also for the field switches 11 and 12. The timing relay 28 hereinbefore mentioned is controlled by normally open contacts 7$^c$ associated with the braking switch 7 and said auxiliary contacts also serve as hereinafter set forth to control the energizing circuit of the field switches 11 and 12.

The function and operation of the aforedescribed controller together with the circuit connections therefor will now be more fully described in connection with Fig. 2. Assuming that the parts are in the position shown in Fig. 1 upon closure of push button 19 relay 17 is energized by a circuit extending from line L$^1$ through the operating winding 17$^a$ of said relay, through push button 19 and thence through push button 21, overload device 22, the auxiliary contacts 7$^b$ and the normally closed contacts 23$^a$ of the safety switch to line L$^2$. Upon response of relay 17 the contacts 17$^c$ thereof connect the operating winding of reversing switch 5 across lines L$^1$—L$^2$ and the contacts 17$^b$ thereof shunt push button 19 to maintain said relay in closed position. Upon response of reversing switch 5 the auxiliary contacts 5$^b$ thereof establish an energizing circuit for relay 26 extending from line LL$^1$ through the auxiliary contacts 5$^b$ through the auxiliary contacts 12$^b$ of field switch 12, through the normally closed timing relay 28 and thence through the operating winding 26$^a$ of said relay to line LL$^2$. Upon response of relay 26 an energizing circuit for the timing relay 25 is established extending from line L$^1$ through the contacts 26$^b$ of said relay, through the normally closed auxiliary contacts 4$^b$ associated with running switch 4, through the normally closed contacts 11$^e$ associated with field switch 11 and thence to and through the operating winding 25$^a$ of said timing relay to line L$^2$. Upon response of timing relay 25 the relay 24 is energized by a circuit extending from line L$^1$ through the contacts 26$^b$ of relay 26 through the auxiliary contacts 4$^b$ associated with the running switch, through contacts 25$^b$ of the timing relay, through the operating winding $24^a$ of relay 24 and thence through the stop push button 21, the overload relay 22, the auxiliary contacts $7^b$ of the braking switch and the normally closed contacts $23^a$ of the safety switch to line $L^2$. Response of relay 24 connects the operating winding $1^a$ of starting switch 1 directly across lines $L^1$—$L^2$.

Upon closure of the starting switch 1 the auto transformer coils 2 and 3 are connected across lines $L^1$—$L^2$ and $L^2$—$L^3$, respectively and two of the terminals of the armature A are connected through reversing switch 5 to intermediate taps on said coils while the other terminal of the armature A is connected to line $L^2$. The armature is thus supplied with low voltage starting current from the supply circuit and the motor will start with its field F connected in shunt across resistance $R^4$ by the normally closed contacts $11^a$ of field switch 11.

Upon closure of relay 26 the auxiliary contacts $26^d$ thereof establish a maintaining circuit therefor extending from line $LL^1$ through said auxiliary contacts, through a resistance $R^8$, through the normally closed contacts of timing relay 28 and thence through the operating winding $26^a$ to line $LL^2$. Upon response of the starting switch 1 the coil $29^b$ of relay 29 is energized by a circuit extending from line $LL^1$ through the auxiliary contacts $1^b$ associated with the starting switch through resistance $R^7$ and through said coil to line $LL^2$. As before stated the coil $29^b$ tends to effect closure of relay 29 against the action of the restraining winding $29^a$. As shown the restraining winding $29^a$ is connected in series with the transformer coil $t^3$ which is included between the second pole of the starting switch 1 and the low voltage tap on the transformer winding 2. The arrangement is such that upon establishment of the starting connections the transformer coil $t^3$ supplies sufficient current to the winding $29^a$ to maintain relay 29 in open position, but after the starting current dies down to a given value the operating winding $29^b$ overcomes the restraining action of winding $29^a$ to effect closure of relay 29. Closure of relay 29 energizes the field switches 11 and 12 by a circuit extending from line $LL^1$ through the contacts $26^c$ of the relay 26, through the relay 29 and thence through the operating windings $11^a$ and $12^a$ of said relays to line $LL^2$. Upon response of field switch 11 the contacts $11^b$ thereof disconnects the left hand terminal of field winding F from resistance $R^4$ and the contacts $11^c$ thereof connect said terminal to line $LL^1$. Closure of field switch 12 connects the right hand terminal of field winding F to line $LL^2$ through the medium of rheostat 14 and the resistor $R^5$.

Upon closure of field switch 11 the contacts $11^e$ thereof interrupt the aforedescribed energizing circuit for the timing relay 25 and said relay returns to normal position against the action of its associated dash pot. Upon return of relay 25 to normal position, the contacts $25^b$ thereof interrupt the aforedescribed energizing circuit for relay 24 and said relay in opening deenergizes starting switch 1. Immediately upon return of relay 24 to normal position relay 27 is energized by a circuit extending from line $L^1$ through the contacts $26^b$ of relay 26, through the auxiliary contacts $11^d$ of field switch 11 through the auxiliary contacts $24^b$ of relay 24, through the operating winding of relay 27 and thence through the normally closed stop push button 21, the overload device 22, the auxiliary contacts $7^b$ associated with the braking switch 7 and the normally closed contacts $23^a$ of the safety switch to line $L^2$. Relay 27 in responding connects the running switch 4 directly across lines $L^1$—$L^2$ and said running switch in responding connects the terminals of the armature winding directly to lines $L^1$, $L^2$ and $L^3$ through the medium of reversing switch 5. Upon opening of starting switch 1 the auxiliary contacts $1^b$ thereof open the aforedescribed energizing circuit for the operating winding $29^b$ of relay 29 but said operating winding is maintained energized by a circuit extending from line $LL^1$ through the auxiliary contacts $26^c$ of relay 26, through resistances $R^6$ and $R^7$ through said operating winding to line $LL^2$. Relay 29 thus remains in closed position upon opening of running switch 4 to maintain the field switches 11 and 12 in closed position. Upon closure of relay 27 field switch 13 is energized by a circuit from line $LL^1$ through the contacts $26^c$ of relay 26, through contacts $27^c$ of relay 27, through the normally closed contacts $25^c$ of timing relay 25 and thence through the operating winding of field switch 13 to line $LL^2$. In responding field switch 13 shunts the resistance $R^5$ whereby the field winding F of the motor is connected across lines $LL^1$ and $LL^2$ through the medium of the regulating rheostat 14. Upon closure of field switch 13 the auxiliary contacts $13^b$ thereof shunt the relay 29 and auxiliary contacts $27^c$ of relay 27, whereby the field switches 11, 12 and 13 are maintained in closed position independently of said relays by the relay 26.

The connections established by main switch 4 and field switches 11, 12 and 13 comprise the running connections for the motor and switch 5 provides for operation of the motor in one direction while switch 6 reverses the motor connections to provide for operation thereof in a reverse direction. Reversing switch 6 is controlled by the relay 18 and upon closure of push button 20 said relay is energized by a circuit extending from line $L^1$ through the operating winding $18^a$ of said relay, through push button 20 and thence through stop push button 21, over load device 22, auxiliary contacts $7^b$ associated with the braking switch 7 and the normally closed contacts 23ª associated with the safety switch to line L². Upon response of relay 18 the contacts 18ᵇ shunt the push button 20 to maintain said relay in closed position and the contacts 18ᶜ of said relay connect the operating winding of reversing switch 6 across lines L¹—L². Closure of reversing switch 6 establishes an energizing circuit for relay 26 extending from line LL¹ through auxiliary contacts 6ᵇ through contacts 12ᵇ associated with field switch 12, through relay 28, and thence through the operating winding 26ª of relay 26 to line LL². Upon closure of relay 26 the controller operates in the manner hereinbefore described to bring the motor up to speed with reversed power connections.

Upon operation of stop push button 21 or safety switch 23, or upon response of overload relay 22, the operating windings for relays 17, 18, 24 and 27 are disconnected from line L². Thus relay 17 or 18 as the case may be, is deenergized, to open its associated reversing switch and if starting switch 1 is closed relay 24 is deenergized to effect opening thereof, while if running switch 4 is closed relay 27 is deenergized to effect opening thereof. In the meantime relay 26 remains in closed position, the same being energized through the aforedescribed maintaining circuit therefor, and assuming that the safety switch 23 has been operated the braking switch 7 is energized by a circuit extending from line L¹ through the contacts 26ᵇ of relay 26, through the operating winding 7ª of said braking switch and thence through the normally open contacts 23ᵇ of the safety switch to line L². In the meantime the open relay 17 or 18, as the case may be, has returned to normal position and the contacts 17ᵈ and 18ᵈ of said relays shunt the contacts 23ᵇ of the safety switch to maintain the braking switch in closed position upon release of the safety switch. In this connection it should be noted that if the stop push button 21 is operated or the overload relay 22 responds, the braking switch 7 is energized independently of the safety switch contacts 23ᵇ through the medium of the contacts 17ᵈ and 18ᵈ of relays 17 and 12. Response of braking switch 7 connects the terminals of the motor armature A across resistances R¹, R² and R³.

Upon closure of the braking switch 7 the auxiliary contacts 7ᶜ thereof connect the operating winding of relay 28 and also the operating windings of field switches 11 and 12 in parallel across lines LL¹ and LL² through the medium of the contacts 26ᶜ of relay 26. Thus if the armature connections for the motor are interrupted before the field switches 11 and 12 have responded, said field switches will be energized upon closure of the braking switch 7. If the field switch 13 has not responded, the same remains in open position, but if the same has responded the auxiliary contacts 13ᵈ associated therewith will maintain the same in closed position.

As hereinbefore set forth with the armature A connected across the resistances R¹, R² and R³ by switch 7 and the field F connected to the supply circuit LL¹ and LL² by switches 11 and 12, the field of the motor generates a voltage in the armature which causes a current to flow therein whereby the motor is converted into an A. C. generator to bring the same quickly to rest.

The braking connections are maintained for a sufficient period to bring the motor to rest and are thereupon interrupted by the relay 28. As before stated, relay 28 is energized upon closure of the braking switch 7 and the same is provided with a dash pot for retarding opening movement thereof. Upon opening of relay 28 against the action of its dash pot the maintaining circuit for relay 26 is interrupted and said relay in returning to normal position interrupts the energizing circuit for the braking switch 7 through opening of its contacts 26ᵇ and also interrupts the energizing circuits for field switches 11, 12 and 13, through opening of its contacts 26ᶜ.

What I claim as new and desire to secure by Letters Patent is:

1. The combination with an alternating current motor, of means for selectively establishing starting and running connections for the armature of said motor and for also establishing dynamic braking connections therefor upon interruption of either of the former connections, and control means for the field of said motor including means for insuring energization thereof for a predetermined interval upon establishment of braking connections by said first mentioned means.

2. The combination with an alternating current motor, of means for selectively establishing low voltage starting connections and full voltage running connections for the armature of said motor and for establishing dynamic braking connections therefor upon interruption of either of the aforesaid connections, means for establishing reduced voltage connections for the field of said motor upon establishment of starting connections for the motor armature and for increasing the field strength of the motor upon establishment of running connections for the motor armature and means associated with said latter means for insuring energization of the motor field upon establishment of braking connections by said first mentioned means.

3. The combination with a synchronous motor, of means for selectively establishing starting and running connections for the armature of said motor, an electrical load, means for connecting said motor armature in circuit with said electrical load upon interruption of either the starting or running connections for the motor armature and field control means for said motor including means for insuring energization of the motor field upon connection of the motor armature to said electrical load.

4. The combination with a synchronous motor, of electro-responsive switches for selectively establishing starting and running connections for the armature of said motor, an electro-responsive switch for establishing braking connections for said motor armature upon interruption of the starting or running connections by said former switches, means for controlling the field of said motor, and means associated with said last mentioned switch for controlling said last mentioned means to insure energization of the field of said motor for a predetermined interval upon establishment of braking connections by said last mentioned switch.

5. The combination with a synchronous motor, of means for selectively establishing low voltage armature connections for starting and full voltage armature connections for running, a switch for establishing braking connections for the armature of said motor upon interruption of starting or running connections by said means and control means for the field of said motor insuring energization thereof for a predetermined interval upon establishment of braking connections by said switch, said means including an electro-responsive timing relay controlled by said switch and responsive to de-energize the field of said motor after a predetermined interval upon establishment of braking connections by said switch.

6. The combination with a synchronous motor, of means for selectively establishing starting and running connections for the armature of said motor, a load circuit, a switch for connecting said motor armature in circuit with said electrical load upon interruption of either the starting or running connections for the motor armature, means for energizing the field of said motor upon establishment of the starting or running connections by said former means and means associated with said switch for insuring energization of the motor field for a predetermined interval upon closure of said switch.

7. The combination with a synchronous motor, of means for selectively establishing starting and running connections for the armature of said motor, a safety switch for controlling said former means, an electro-responsive switch also controlled by said safety switch for establishing dynamic braking connections for said motor armature upon interruption of said starting or running connections, means for controlling the fuel of said motor upon establishment of said starting or running connections and means controlled by said electro-responsive switch for insuring energization of the field of said motor for a predetermined interval upon establishment of said braking connections.

8. The combination with a synchronous motor, of means for selectively establishing starting and running connections for the armature of said motor, a safety switch for controlling said former means, an electro-responsive switch also controlled by said safety switch for establishing dynamic braking connections for said motor armature upon interruption of said starting or running connections, means for controlling the field of said motor upon establishment of said starting or running connections and means controlled by said electro-responsive switch for insuring energization of the field of said motor for a predetermined interval upon establishment of said braking connections, said latter means including an electro-responsive timing relay controlled by said electro-responsive switch.

In witness whereof, I have hereunto subscribed my name.

RALPH G. LOCKETT.